United States Patent
Cooper et al.

(10) Patent No.: US 6,701,330 B1
(45) Date of Patent: Mar. 2, 2004

(54) PROTECTING DUPLICATE/LOST UPDATES AGAINST HOST FAILURES

(75) Inventors: Thomas P. Cooper, New Brighton, MN (US); Michael J. Hill, Vadnais Heights, MN (US); Dennis R. Konrad, Welch, MN (US); Thomas L. Nowatzki, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 930 days.

(21) Appl. No.: 09/001,138

(22) Filed: Dec. 30, 1997

(51) Int. Cl.[7] .............................................. G06F 12/00

(52) U.S. Cl. ............................ 707/202; 707/8; 707/201

(58) Field of Search ..................................... 707/1–224

(56) References Cited

U.S. PATENT DOCUMENTS

| | | | | |
|---|---|---|---|---|
| 4,218,582 A | * | 8/1980 | Hellman et al. ............... | 380/30 |
| 4,314,331 A | | 2/1982 | Porter et al. ................. | 364/200 |
| 4,394,733 A | | 7/1983 | Swenson ..................... | 364/200 |
| 4,603,380 A | | 7/1986 | Easton et al. ................ | 364/200 |
| 4,897,781 A | | 1/1990 | Chang et al. ............... | 364/200 |
| 4,967,353 A | | 10/1990 | Brenner et al. ............ | 364/200 |
| 5,043,885 A | | 8/1991 | Robinson ..................... | 364/200 |
| 5,163,131 A | | 11/1992 | Row et al. .................... | 395/200 |
| 5,187,790 A | * | 2/1993 | East et al. ................... | 709/107 |
| 5,193,162 A | | 3/1993 | Bordsen et al. ............ | 395/425 |
| 5,263,145 A | | 11/1993 | Brady et al. ................ | 395/425 |
| 5,305,389 A | | 4/1994 | Palmer .......................... | 382/1 |
| 5,309,451 A | | 5/1994 | Noya et al. ................. | 371/40.4 |
| 5,321,841 A | * | 6/1994 | East et al. ................... | 709/107 |
| 5,325,509 A | | 6/1994 | Lautzenheiser ............ | 395/425 |
| 5,353,425 A | | 10/1994 | Malamy et al. ............. | 395/425 |
| 5,390,318 A | | 2/1995 | Ramakrishnan et al. .... | 395/425 |
| 5,893,115 A | * | 4/1999 | Lewis .......................... | 707/201 |

OTHER PUBLICATIONS

Cohen, King and Grady, Storage Hierarchies, pp. 62–76, IBM Systems Journal vol. 28, No. 1, 1989.

Nelson, Welchand Ousterhout, Caching in the Sprite Network File System, pp. 134–154, ACM Transactions on Computer Systems, vol. 6, No. 1, Feb. 1988.

Howard, John H. et al., Scale and Performance in a Distributed File System, pp. 51–81, ACM Transactions on Computer Systems, vol. 6, No. 1, Feb. 1988.

* cited by examiner

*Primary Examiner*—Safet Metjahic
*Assistant Examiner*—Brian Goddard
(74) *Attorney, Agent, or Firm*—Charles A. Johnson; Mark T. Starr; Nawrocki, Rooney & Sivertson, P.A.

(57) ABSTRACT

Method and apparatus for tracking messages and transactions communicated between a number of users and a number of hosts, where the hosts are executing concurrent applications. During a first user session, a first user communicates with a first host. A counter associated with the first user session is incremented when the application creates an output message. The counter is decremented when the output message is released to the first user. A flag associated with the first user session is set and the counter is incremented once the flag is set, if an input message or committing transaction is received from the first user. The flag is cleared and the counter is decremented when the input message or committing transaction is processed by the concurrent application. The counter being decremented indicates there are no dependencies during the first user session with regard to the output message, input message, or committing transaction. If a second user session is initiated with a second host, the second host determines if there are any dependencies with the first user session. A dependency exists if the output message is created but not released, or if the input message or committing transaction is received but not processed. If there are dependencies, the first user session is reestablished to resolve the dependencies, otherwise, the second session is continued.

31 Claims, 15 Drawing Sheets

| HOST MEMORY TABLE | |
|---|---|
| TERMINAL SESSION ID | COMM. SOFTWARE INSTANCE |
| #111 | #1 |
| #222 | #1 |
| #333 | #2 |
| ... | ... |
| #444 | #2 |

FIG. 8

PROTECTING DUPLICATE/LOST UPDATES AGAINST HOST FAILURES

CROSS REFERENCE TO CO-PENDING APPLICATIONS

The present application is related to U.S. Pat. No. 6,055,547, filed Dec. 30, 1997, entitled "Shared File Allocation and Release"; U.S. Pat. No. 5,734,817, filed Mar. 1, 1995, entitled "Method for Making a Database Available to a User Program During Database Recovery"; U.S. Pat. No. 5,809,527, filed Dec. 23, 1993, entitled "Outboard File Cache System"; and U.S. Pat. No. 5,809,543, filed Nov. 7, 1996, entitled "Extended Processing Complex for File Caching", which is a continuation of Ser. No. 08/173,459, filed Dec. 23, 1993, entitled "Extended Processing Complex for File Caching", abandoned all assigned to the assignee of the present invention and all incorporated herein by reference.

BACKGROUND OF THE INVENTION

1. Field of the Invention

The present invention generally relates to digital data processing systems, and more particularly, to such systems using messages in concurrent applications where a common database is being accessed by multiple hosts.

2. Description of the Prior Art

Often times data processing systems are used in high volume transaction operations, where multiple host systems process transactions via concurrent applications. These concurrent applications can be application groups that operate on multiple hosts and access a common database.

In a transaction processing system, a given application group processing a single transaction may process one or more input messages. In addition, the application group processing the single transaction may provide one or more output messages. Input messages can include network input messages which are created by, for example, a workstation or automatic teller machine (ATM). Input messages may also include check point messages created by the transaction being processed by the current application group to replace it's input message, or pass off messages created by transactions being processed by other application groups. Output messages may include messages to be transmitted to a user, such as the workstation or ATM. Output messages may also include pass off messages which become input messages for other transactions being processed by other application groups, or check point messages.

Typically, if one of the concurrent hosts fails, the integrity of the application groups running on that host may be compromised. For example, a user may inadvertently cause duplicate messages or transactions to be executed, or may improperly reexecute a previous input message or transaction request. That is, if a user sends a recoverable message or transaction request to one of the application groups, the corresponding host may fail before a resulting recoverable output message is delivered back to the user. If an input message or transaction request is recoverable, the user must not resend the input message or transaction request. Rather, the user must wait until the failed host recovers, and then reestablish communication with the recovered host. This is necessary in order for the recovered input message or transaction to be reprocessed, or for the resulting output message to be delivered to the user. If the input message or transaction request is not recoverable, the user must resend the message, if the previous message did not complete successfully.

In many prior art systems, when using recoverable messages in concurrently executed applications, the user cannot readily determine whether the last input message or transaction must be resent in the event one of the hosts fails. In some cases, re-sending can cause a duplicate message to be processed. In other cases, not re-sending the request can result in an omitted request. One approach to insure the integrity of the requests is to require all workstation users with sessions on the failed host to wait until the failed host recovers. The users may then reestablish the session with the failed host and determine the status of the previous input message or transaction. A limitation of this approach is that all of the users of the failed host are penalized because they all have to wait for the failed host to recover even though many of the users did not have any outstanding messages or transaction requests pending when the host failed.

SUMMARY OF THE INVENTION

The present invention overcomes many of the disadvantages associated with the prior art by providing a method and apparatus for tracking messages and transactions communicated between a number of users and a number of hosts. The present invention enables the communication of messages and transactions without a potential of their being lost or duplicated. In the preferred embodiment, each user session corresponds with a user communicating with a host, where one or more of the hosts may be executing concurrent applications. During a first user session, a first user may communicate with a first host. If an input message or committing transaction has been received by the first host from the first user, a flag associated with the first user session is set. The counter associated with the first user session is incremented when the flag is set. Once the input message or committing transaction has been processed by the concurrent application, the flag is cleared. The counter is decremented once the flag is cleared. The counter being decremented indicates there are no dependencies during the first user session with regard to the input message. A dependency exists if the input message has been received by the host but has not yet been processed.

If the concurrent application creates an output message to be sent to the first user, a counter associated with the first user session is incremented. Once the output message is released to the first user, the counter is decremented. The counter being decremented indicates there are no dependencies during the first user session with regard to the output message. A dependency exists if the concurrent application creates an output message which has not been released to the user. The counter being zero indicates there are no dependencies during the first user session with regard to any input or output message.

In an exemplary embodiment, an output message may be created in response to an input message. For example, if an input message or committing transaction has been received by the first host from the first user, a flag associated with the first user session is set. The counter associated with the first user session is incremented when the flag is set. In the exemplary embodiment, the counter is incremented to a count of "1". Next, when the concurrent application creates an output message to be sent to the first user in response to the input message, the counter associated with the first user session is incremented once again. In the exemplary embodiment, the counter is incremented to a count of "2". When the input message has been processed by the concurrent application, the flag is cleared. The counter is decremented once the flag is cleared. In the exemplary embodiment, the counter is incremented to a "1". Once the output message is sent to the first user, the counter is decremented. In the exemplary embodiment, the counter is incremented to a "0". Thus in the exemplary embodiment, the counter being decremented to a count of "0" indicates there are no dependencies during the first user session with regard to the input or output message.

In the preferred embodiment, the user may establish a second user session with a second host. The second user session may be established for any number of reasons, such as the first host experiencing a failure, or the user being auto-switched to the second host. Once the second session is established, the second host may determine if there are any dependencies for the first user session with the first host. If there are dependencies, the first user session must be reestablished to resolve the dependencies. Only those sessions which have dependencies with the failed host must wait for the failed host to recover. All other sessions, including idle user sessions, may be readily transferred to another host to establish new user sessions.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a table showing a mapping of the terminal session identifiers to the associated communication software instances for the host of the exemplary embodiment shown in FIG. 7;

DETAILED DESCRIPTION OF THE PREFERRED EMBODIMENTS

Figure 1:
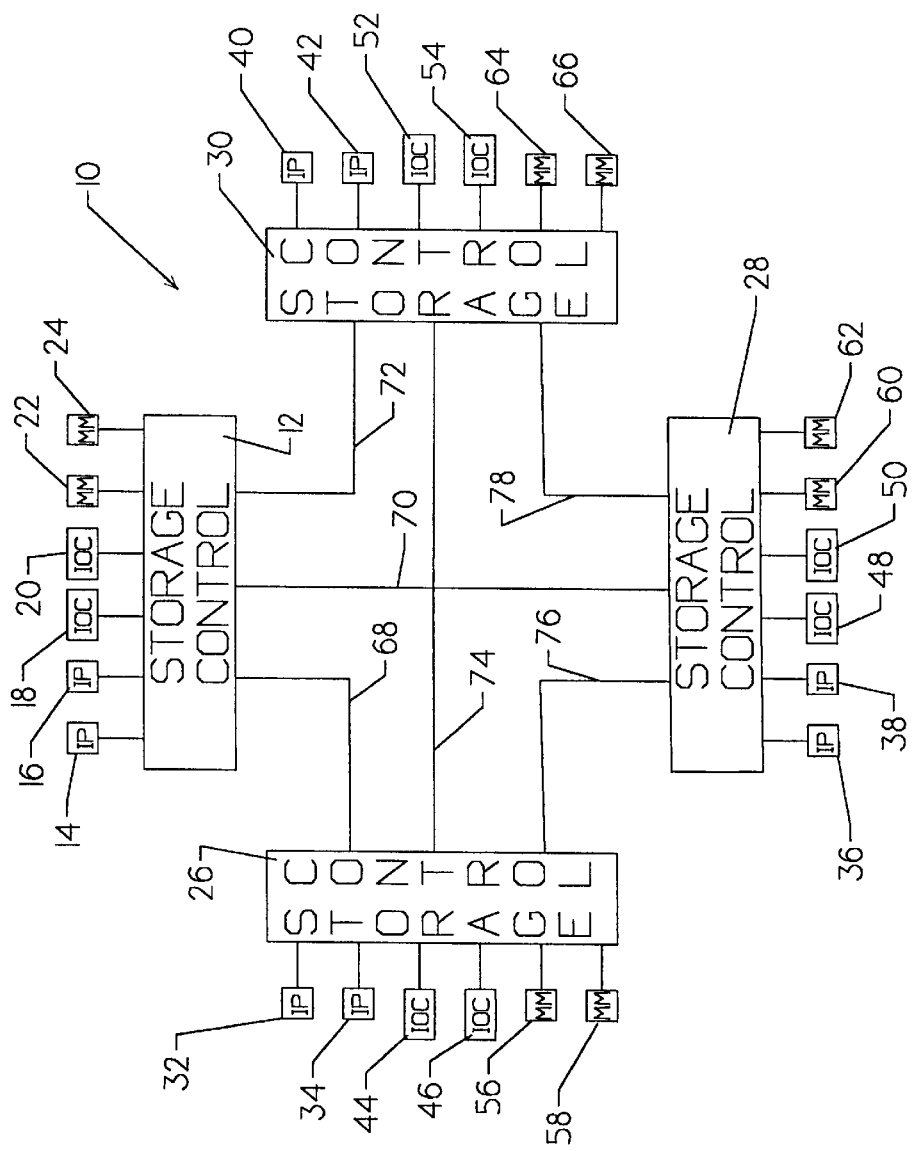
FIG. 1 is a block diagram of the preferred host data processing system in which the present invention is implemented.

FIG. 1 is a schematic diagram of the preferred data processing system 10 in which the present invention may be utilized. It is recognized that the present invention may be utilized in any computer system which tracks messages and transactions communicated between a number of users and a number of hosts, where the number of hosts are executing a concurrent application which is updating a common data base.

In the exemplary embodiment, data processing system 10 may include four independent operating environments each having their own storage controller and point-to-point communications with the other independent operating environments via a storage controller to storage controller interface. It is understood however that up to eight independent operating environments, each having their own storage controller and point-to-point communications with the other independent operating environments via a storage controller to storage controller interface, may exist in accordance with the present invention. Each independent operating environment is referred to as a partition. A partition has its own operating system software which manages the allocation of resources within the partition. Because a partition may have its own operating system, it may be referred to as a data processing system. Thus, data processing system 10 may be partitioned into four data processing systems, including a first data processing system having the resources accompanying storage controller 12, a second data processing system having the resources accompanying storage controller 26, a third data processing system having the resources accompanying storage controller 28, and a fourth data processing system having the resources accompanying storage controller 30.

Each data processing system or partition may further be contained within a unique power domain. For example, the power source for the first data processing system could be independent from the power source for the second data processing system, the third data processing system, and the fourth data processing system. A loss of power within one power domain would then not affect the power within any other power domain.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output complex 18, input/output complex 20, main memory module 22 and main memory module 24. Each of instruction processors 14 and 16 (along with similar instruction processors 32, 34, 36, 38, 40, and 42) has internal dedicated cache resources in the form of an instruction cache and an operand cache.

Input/output complexes 18 and 20, along with main memory modules 22 and 24, may be elements currently available, such as found in the Unisys Model 2200/600 series. Input/output complexes 44, 46, 48, 50, 52, and 54 and main memory modules 56, 58, 60, 62, 64, and 66 may be similarly found. Each of the input/output complexes 18, 20, 44, 46, 48, 50, 52, and 54 may contain multiple input/output processors (see also, FIG. 4). The input/output processors read data from main memory modules 22, 24, 56, 58, 60, 62, 64, and 66 to write to the peripheral devices, and read data from the peripheral devices to write to the main memory modules. Peripheral devices may include printers, tape drives, disk drives, network communication processors etc.

Storage controllers 12, 26, 28, and 30 may each control a separate database. For example, storage controller 12 may store a first database in memory modules 22 and 24. Similarly, storage controller 26 may store a second database in memory modules 56 and 58, storage controller 28 may store a third database in memory modules 60 and 62, and storage controller 30 may store a fourth database in memory modules 64 and 66. Any instruction processor may access any database. For example, instruction processors 14 and 16 may access any of the databases stored in memory modules 22, 24, 56, 58, 60, 62, 64, and 66, via interfaces 68, 70, 72, 74, 76, and 78.

Figure 2:
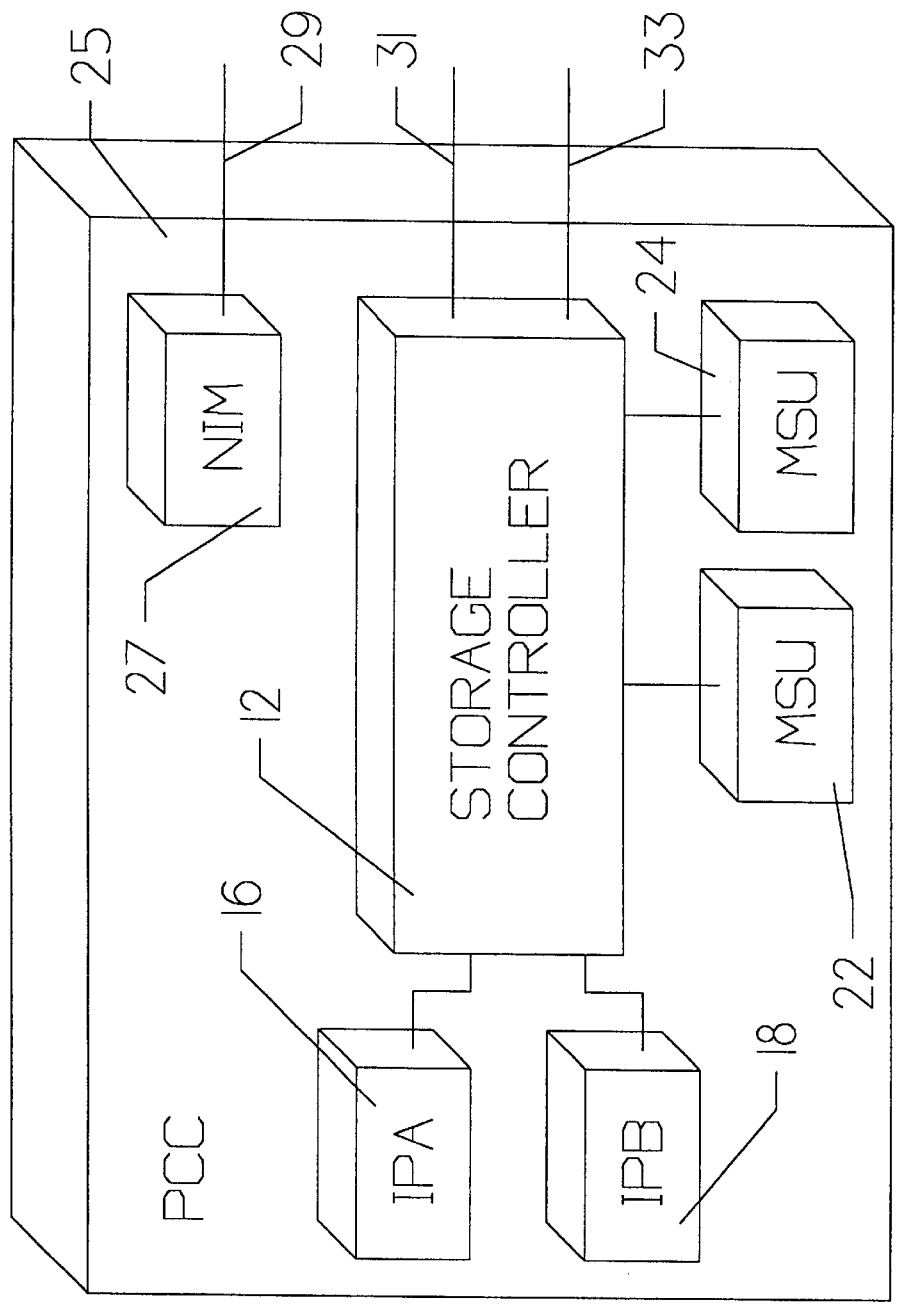
FIG. 2 is a pictorial diagram showing the packaging arrangement of the host processing system of FIG. 1.

FIG. 2 is a schematic diagram showing the packaging of a portion of data processing system 10. A major physical element of data processing system 10 is Processing Complex Cabinet (PCC) 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module 27 provides an interface to the operator console via cable 29. Cables 31 and 33 couple input/output complexes 18 and 20 to storage controller 12 (see also, FIG. 1). Other referenced elements are as previously described.

Figure 3:
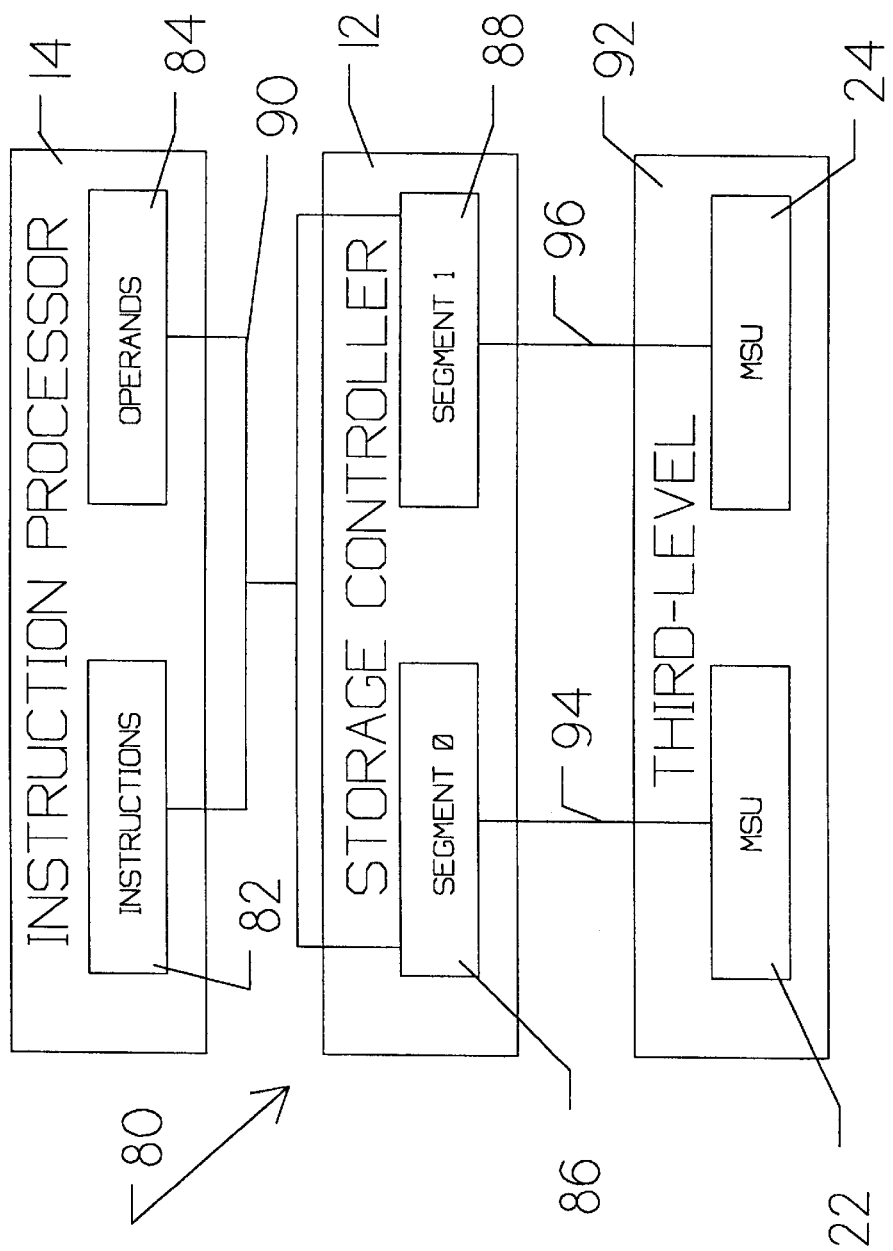
FIG. 3 is a block diagram of the levels of storage for a single instruction processor.

FIG. 3 is a block diagram 80 showing the hierarchical arrangement of the three levels of storage within data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element.

Storage controller 12 contains an intermediate level cache segment of 128 k 36 bit words for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output complexes, and three other storage controllers (see also, FIG. 1). Each data element request is divided between segment 0 cache 86 and segment 1 cache 88 based upon the requested address. Only if the requested data element is not validly present in the appropriate intermediate level cache resource is an access request made to third level 92.

Figure 4:
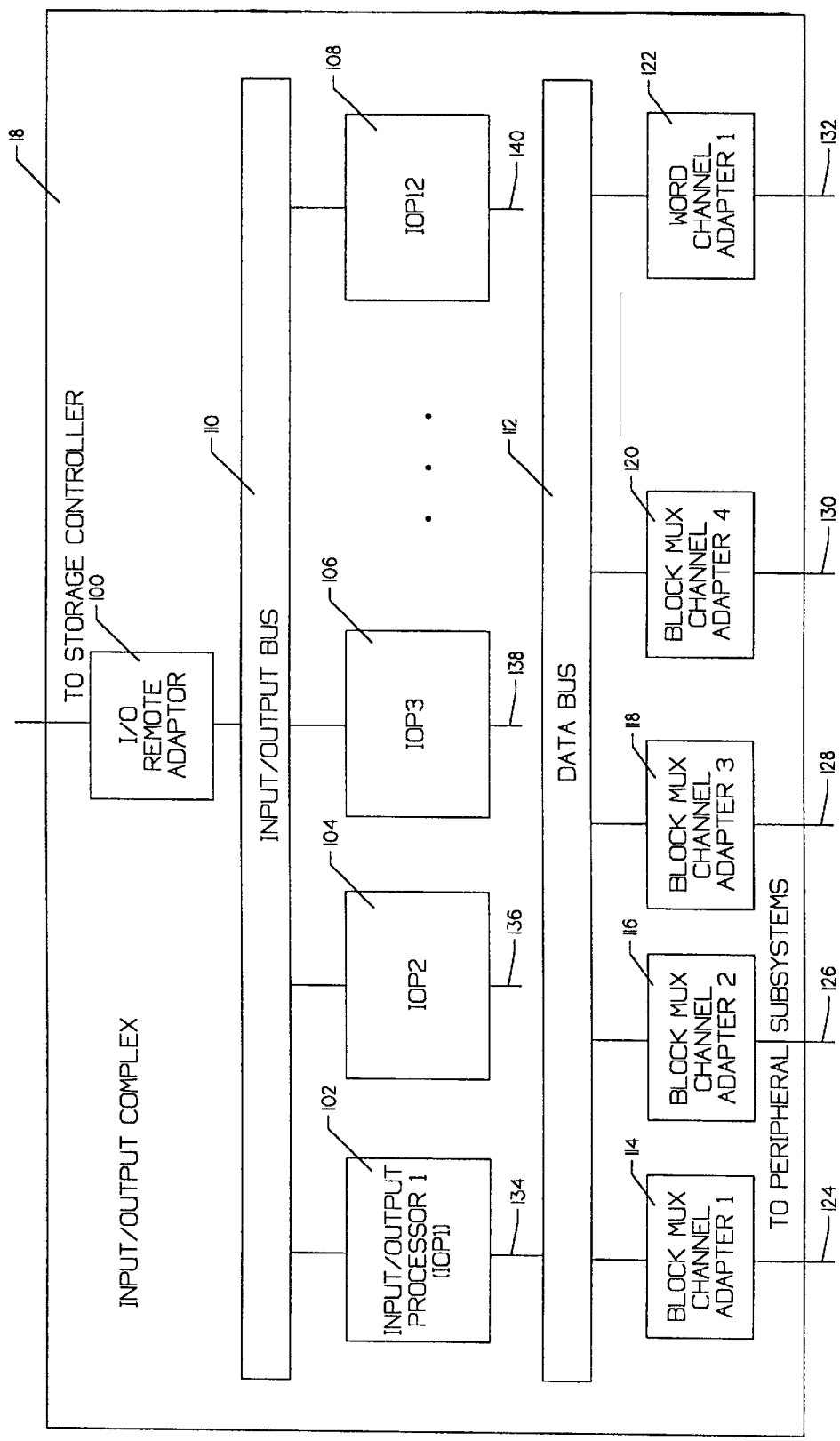
FIG. 4 is a block diagram showing the architecture of an input/output complex of the exemplary host.

FIG. 4 shows the architecture of an input/output complex 18 of data processing system 10. It is understood that input/output complex 18 is representative of input/output complexes 18, 20, 44, 46, 48, 50, 52, and 54. Input/output remote adaptor 100 is a non-intelligent adaptor which transfers data and messages between an associated storage controller (e.g., storage controller 12) and an associated input/output processor. The associated input/output processors are input/output processor 1 102, input/output processor 2 104, and input/output processor 3 106 through input/output processor 12 108. The data and messages are transferred to the associated input/output processor via an input/output bus 110. Input/output remote adaptor 100 occupies one physical dropout of the thirteen available on input/output bus 110, and has the highest priority of any unit connected to input/output bus 110. Input/output remote adaptor 100 does not participate in a rotational priority operation and can gain access to input/output bus 110 through a normal request process even when other units coupled to input/output bus 110 are operating in a rotational priority mode. Input/output bus 110 provides a communication path and protocol to transfer data between the attached units. Input/output bus 110 can accommodate twelve input/output processors.

Input/output processors 102, 104, and 106 through 108 are microprocessor controlled units that control the initiation, data transfer, and termination sequences associated with software generated I/O channel programs. Initiation and termination sequences are executed by the microprocessor (not shown), and data transfer is controlled by hard-wire logic (not shown). Each of input/output processor 102, 104, and 106 through 108 is coupled to a data bus 112, which in turn has available slots for up to four block space MUX channel adaptors labeled 114, 116, 118 and 120. Data bus 112 is also coupled to a word channel adaptor 122. Block MUX channel adaptor 1 114, block MUX channel adaptor 2 116, block MUX channel adaptor 3 118, block MUX channel adaptor 4 120 and word channel adaptor 1 122 are coupled to their respective peripheral subsystems (not shown) via interfaces 124, 126, 128, 130 and 132, respectively. Input/output processor 1 102 is shown coupled to data bus 112 via interface 134. It is understood that input/output processor 2 104, and input/output processor 3 106 through input/output processor 12 108 are each coupled to an associated data bus (not shown). The other eleven data buses which are not shown provide connections for additional channel adaptors. Interfaces 136, and 138 through 140 represent the coupling between input/output processor 2 104, and input/output processor 3 106 through input/output processor 12 108, respectively, and their associated data buses.

Figure 5:
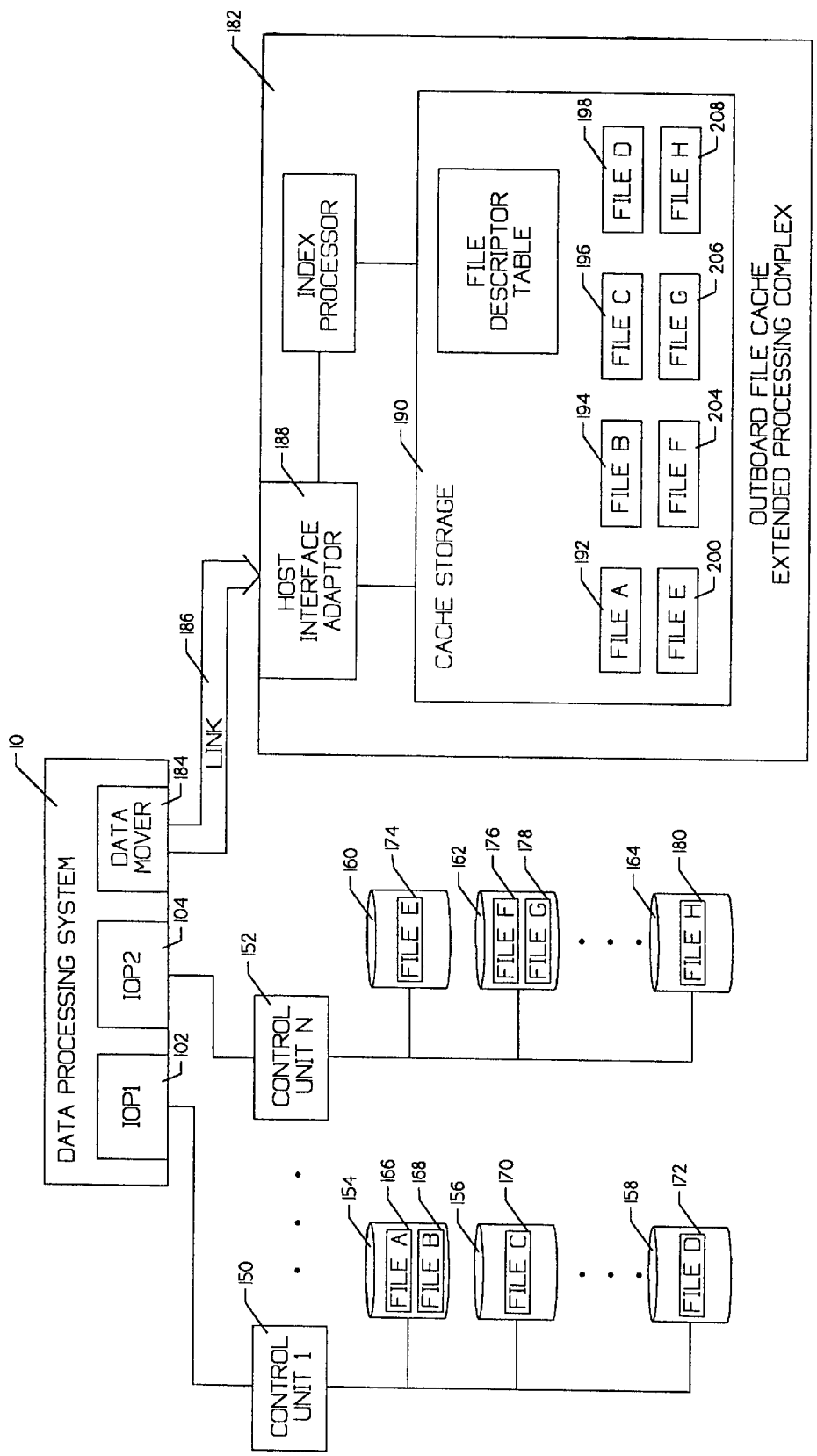
FIG. 5 is a block diagram of the outboard file cache in a data storage hierarchy.

FIG. 5 illustrates an outboard file cache in a data storage hierarchy. A plurality of control units labeled 150 through 152 are coupled to data processing system 10 via input/output processor 1 102 and input/output processor 2 104, respectively, for providing access to disks 154, 156 through 158, 160, and 162 through 164. Application and system software executing on data processing system 10 reads data from and writes data to files 166, 168, 170, 172, 174, 176, 178 and 180. While these files are depicted as blocks, it should be understood that the data is not necessarily stored contiguously on disks 154, 156 through 158, 160, and 162 through 164. These disks provide a backing store for retaining the files. In the storage hierarchy, disks would fall into the category of backup or secondary storage, with primary storage being the main memory modules of data processing system 10.

Extended processing complex 182 is an outboard cache storage for disks 154, 156 through 158, 160, and 162 through 164, having resiliency against data loss. A data mover 184 is coupled to input/output bus 110 (see FIG. 4) and provides a functionality which is similar to an input/output processor such as input/output processor 1 102. Data mover 184 provides a closely coupled, direct, high-speed communications link 186 to host interface adaptor 188 within extended processing complex 182.

All or part of files 166, 168, 170, 172, 174, 176, 178 and 180 may be stored within cache storage 190. The portion of files 166, 168, 170, 172, 174, 176, 178 and 180 that are stored in cache storage 190 are shown respectively as blocks 192, 194, 196, 198, 200, 204, 206 and 208. The cache portion of files 166, 168, 170, 172, 174, 176, 178 and 180 are labeled respectively as "file A", "file B", "file C", "file D", "file E", "file F", "file G", and "file H" for discussion purposes. Thus file A 166 is all or the portion of file A that is stored in file A 192. File B 168 is all or the portion of file B that is stored in File B 194, and so on for files C through H, respectively. Extended processing complex 182 allows references to cache files to be immediately directed to cache storage 190 for processing. It is also understood that cache storage 190 may be a non-volatile memory.

A more detailed discussion of the outboard file cache and the extended processing complex may be found in U.S. patent application Ser. No. 08/174,750, filed Dec. 23, 1993, entitled "Outboard File Cache System", and U.S. patent application Ser. No. 08/745,111, filed Nov. 7, 1996, entitled "Extended Processing Complex for File Caching", which have been incorporated herein by reference.

Figure 6:
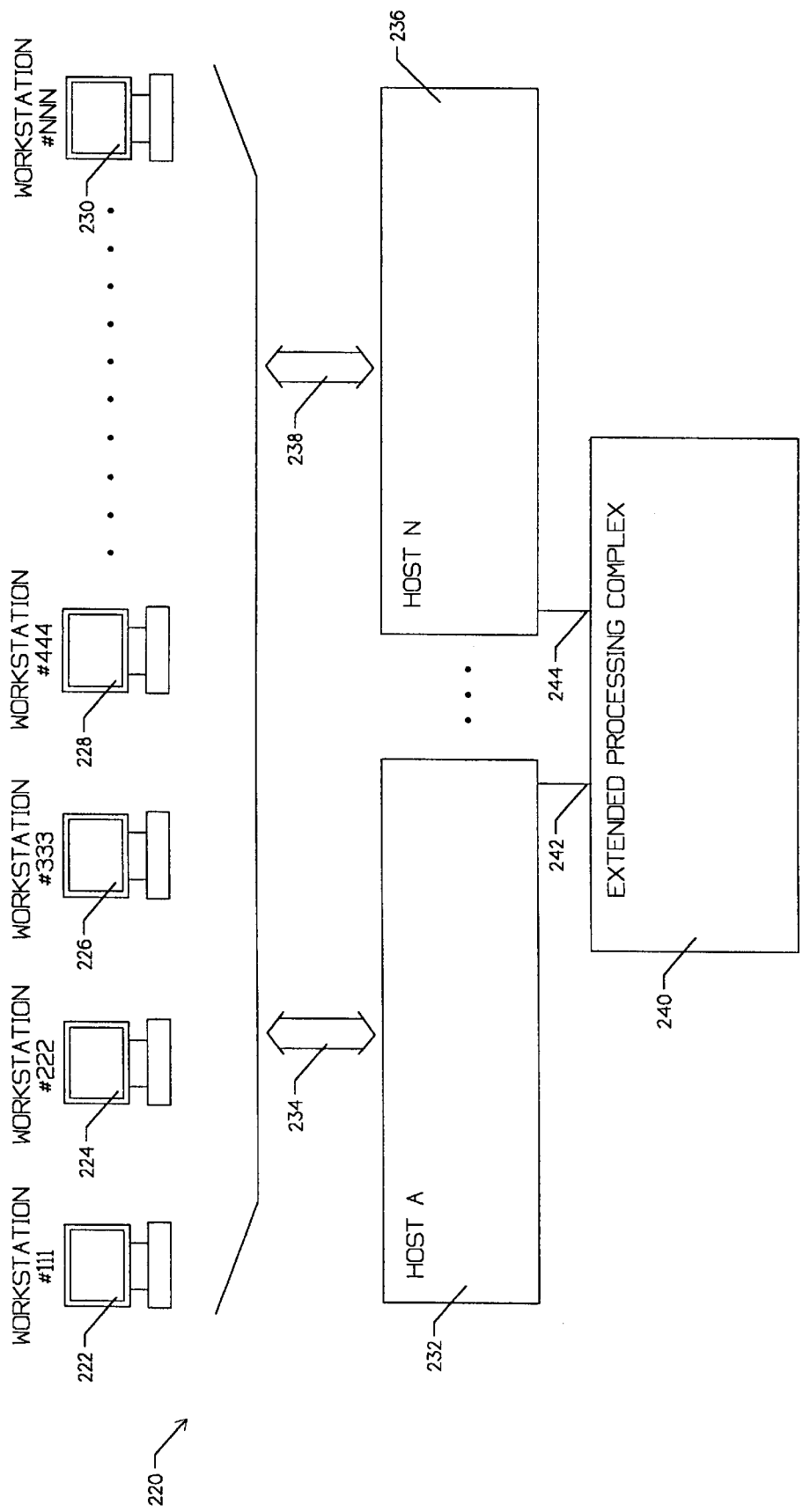
FIG. 6 is a block diagram showing an exemplary embodiment of the present invention.

FIG. 6 is a block diagram showing an exemplary embodiment of the present invention. The block diagram is shown generally at 220. In high volume transaction operations, there may be one or more input terminals or workstations coupled to one or more host computing systems. In the diagram at 220, workstation 222, workstation 224, workstation 226, workstation 228 through workstation 230 are coupled to a number of hosts, illustrated as host A 232 through host N 236. It is understood that the workstations may be coupled to any of host A 232 through host N 236 via representative communication links 234 and 238, wherein representative communication links 234 and 238 may be any means well known in the art, such as local area networks, telephone line linkages, or any other means which provide interconnection for a number of diverse workstation locations to the host processors.

In the transaction application environment, any number of workstations 222, 224, 226, and 228 through 230 may be engaged in terminal sessions with any of host A 232 through host N 236, where host A 232 through host N 236 may be any number of hosts. Each terminal session is identified by a unique identifier or terminal ID, shown illustratably as number #111 for workstation 222, #222 for workstation 224, #333 for workstation 226, #444 for workstation 228 through #NNN for workstation 230. It is further understood that just as host A 232 through host N 236 represents any number of hosts, workstations 222, 224, 226, and 228 through 230 represent any number of workstations or users which are coupled to host A 232 through host N 236. It is further understood that each of host A 232 through host N 236 may be independent operating environments. For example, each host may be in an independent operating environment in data processing system 10 as disclosed in FIG. 1.

Each one of host A 232 through host N 236 may be coupled one or more common memories or databases wherein transactions being processed by host A 232 through host N 236 may update the one or more common databases. It is understood that these common databases may be any of the memory resources within data processing system 10, such as main memory modules 22, 24, 56, 58, 60, 62, 64, or 66, as shown in FIG. 1. It is further understood that the one or more common databases may be any of the memory resources within extending processing complex 182, such as cache storage 190, is shown in FIG. 5.

Host A 232 through host N 236 are further coupled to extended processing complex 240 (see also, FIG. 5). Extended processing complex 240 may be located within any of the independent operating environments or partitions within data processing system 10. Host A 232 is coupled to extended processing complex 240 via interface 242. Host N 236 is coupled to extended processing complex 240 via interface 244. Within data processing system 10, interface 242 and interface 244 may be representative of any of the interfaces interconnecting storage controller 12, storage controller 26, storage controller 28, and storage controller 30.

Figure 7:
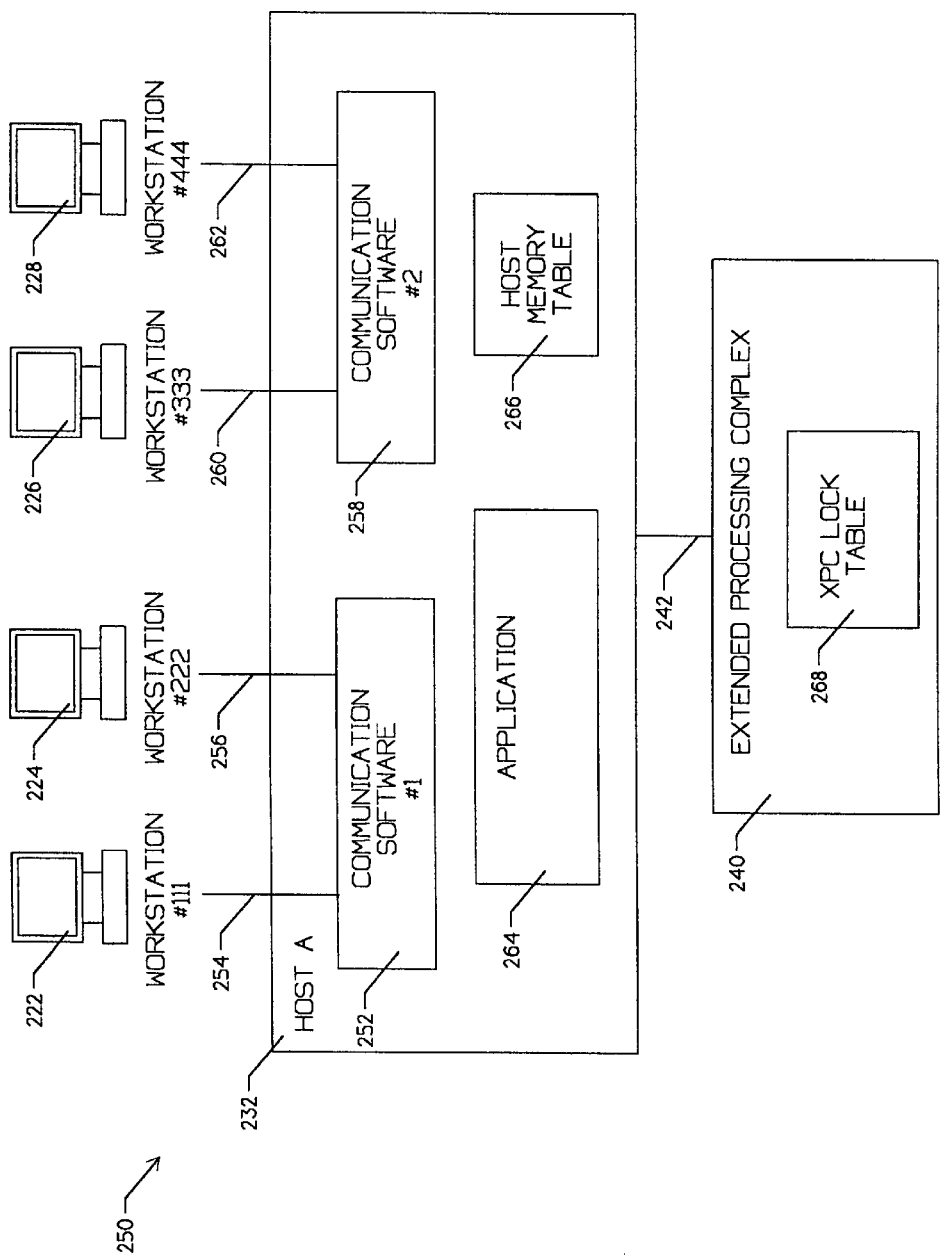
FIG. 7 is a detailed block diagram showing an exemplary embodiment of the present invention.

FIG. 7 is a detailed block diagram showing an exemplary embodiment of the present invention. The detailed diagram is shown generally at 250 and includes workstation 222, workstation 224, workstation 226, and workstation 228. These workstations are exemplary workstations which are each communicating with host A 232 via a unique terminal session. For example, workstation 222 is communicating with host A 232 via a terminal session identified by terminal ID #111. In a likewise fashion, workstation 224, 226 and 228 are each communicating with host A 232 with unique terminal sessions identified as terminal ID #222, #333 and #444, respectively.

In the transaction application environment, there may be several instances of communication software which support communication between the workstations and the concurrent application. The concurrent application may be any application or number of application groups where a common database is being updated by a number of hosts. The diagram at 250 shows workstation 222 coupled to communication software number 1 252 via interface 254. Furthermore, workstation 224 is coupled to communication software number 1 252 via interface 256. In a likewise fashion, workstation 226 is coupled to communication software number 2 258 via interface 260 and workstation 228 is coupled to communication software number 2 258 via interface 262. Interfaces 254, 256, 260 and 262 are illustrative to show that particular communication software instances support particular terminal sessions between workstations 222, 224, 226 and 228 and application 264 within host A 232. Application 264 may be a concurrent application in which a common database is currently under update from multiple hosts. It is further understood that the common database may be contained in any of hosts A 232 through host N 236 (see also, FIG. 6).

Within data processing system 10, each host may access the memory resources of any other host (see also, FIG. 1). Thus, it is not necessary that the common database or memory reside within host A 232. Host memory table 266 resides within host A 232 and is used to map each terminal ID to its communications software instance. As application 264 is processing terminal sessions with each of workstations 222, 224, 226 and 228, each arriving input message is tagged with its terminal ID since application program 264 typically sends an output message back to the same workstation or terminal. In multi-host applications, each host maintains host memory tables for the network terminals or workstations it is servicing so that transactions running on any given host may send output messages to terminals with sessions on that host.

Thus, in the transaction processing environment shown in FIG. 7, application 264 may be put into execution to retrieve and process one or more input messages. The input messages may include a network input message created by one of the workstations or, for example, by an automatic teller machine. These input messages may also include messages created by another application program residing on any one of host A 232 through host N 236. These input messages may also include a check point message created during the execution of application 264.

In the transaction processing environment, application 264 being executed may create many types of output messages to be sent to one of the number of users or workstations. For example, a network output message may be created which is to be transmitted to a workstation or automatic teller machine. A pass-off message may be created which becomes an input message for another application program resident on any of hosts A 232 through host N 236. The output message may also be a check point message which replaces the executing application 264 program's input message at its next intermediate commit point. Furthermore, during execution of application 264, any of workstations 222, 224, 226, or 228 may make requests for database changes or create output destination messages via application 264. Thus, if the transaction's requested database changes must be made permanent as a unit only if the transactions successfully completes (i.e., commits), application 264 must complete successfully before the database changes and destination messages are deemed to be valid or made permanent.

Extended processing complex 240 is coupled to host A 232 via interface 242. It is understood that extended processing complex 240 may be coupled to any of host A 232 through host N 236 (see also, FIG. 6). Extended processing complex 240 further contains XPC lock table 268. XPC lock table 268 provides a means to keep track of the status of messages communicated between application 264 being executed on host A 232 and workstations 222, 224, 226 and 228. XPC lock table 268 counts messages for each terminal or user sessions to determine if there are any dependencies for the corresponding user session. XPC lock table 268 may be comprised of a number of counters, wherein each one of the number of counters corresponds to one of the number of user sessions or terminal identifiers, wherein each one of the number of counters counts the messages for the corresponding one of the number of user sessions to determine if there are any dependencies for the corresponding one of the number of user sessions. It is understood that XPC lock table 268 may be any memory resource within the extended processing complex 248, such as cash storage 190 (see also, FIG. 5). XPC lock table 268 may consist of a number of entries which count messages or transactions communicated between a given workstation and host A 232 for each given terminal identifier (e.g., #111, #222, #333, or #444 in the illustration shown in FIG. 7). It is further understood that the block diagram shown at 250 is exemplary and that XPC lock table 268 may consist of a number of entries which count messages or transactions communicated between any number of hosts, which each are coupled to any number of workstations (see also, FIG. 6).

FIG. 8 is a table showing a mapping of the terminal session identifiers to the associated communication software instances for the host of the exemplary embodiment shown in FIG. 7. The host memory table is shown generally at 280. A first column is shown at 282 which is the terminal session ID. A second column is shown at 284 which is the communication software instance. As workstations 222, 224, 226 and 228 communicate with host A 232 via unique terminal sessions identified by #111, #222, #333 and #444, respectively, each arriving input message is tagged with its terminal identifier as the transaction program or application 264 within host A 232 will send output or destination messages back to the same workstation. If a particular transaction in a particular terminal session terminates with a commit transaction, any output message from application 264 is routed to the particular communication software instance, either communication software #1 252 or communication software #2 258 in the illustration shown in FIG. 7. Thus, host memory table 280 is used to map the terminal session identifier to its associated communication software instance.

In reference to FIG. 7, for session 1, terminal session identifier #112 shown at 286 corresponds to communication software instance #1 shown at 288. For terminal session 2, terminal session ID #222 shown at 290 corresponds with communication software instance #1 shown at 292. For terminal session 3, terminal session ID #333 shown at 294 corresponds with communication software instance #2 shown at 296. It is understood as described in FIG. 6 that any number of workstations 222, 224, 226, and 228 through 230 may have terminal sessions with any of host A 232 through host N 236. Since host A 232 through host N 236 are coupled to extended processing complex 240, XPC lock table 268 may be mapping any number of terminal session IDs to their respective communication software instance. Thus, for terminal session N, terminal session ID #444 shown at 298 corresponds to communication software instance #2 shown at 300.

Figure 9:
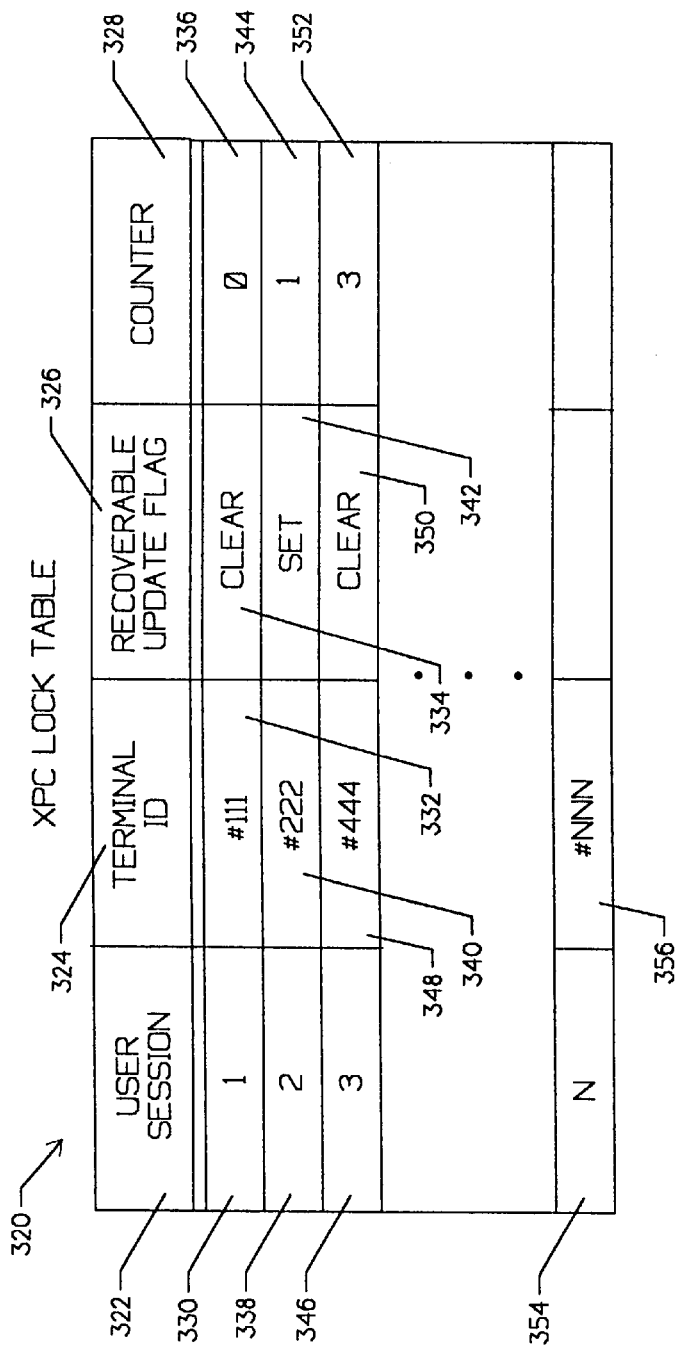
FIG. 9 is a table showing the status of messages being processed by one or more of the hosts shown in FIG. 6 and FIG. 7.

FIG. 9 is a table showing the status of messages being processed by one or more of the hosts shown in FIG. 6 and FIG. 7. The table is an XPC lock table which is shown generally at 320. XPC lock table 320 has a user session column at 322, a terminal ID column at 324, a recoverable update flag column at 326 and a counter column at 328. In the preferred embodiment, the entries under user session 322 represent a counting means. Each entry under user session 322 tracks messages for the corresponding one of the number of user sessions. Furthermore, each entry under terminal ID 324, recoverable update flag 326 or counter 328 corresponds to one of the number of user sessions. As XPC lock table 320 tracks messages for any of workstations 222, 224, 226, and 228 through 230, which have terminal sessions with host A 232 through host N 236, it is understood that there may be any number of user sessions which are currently being tracked by XPC lock table 320.

In the exemplary embodiment shown in FIG. 7, each one of the number of entries within XPC lock table 320 has a corresponding counter entry. These counter entries are tracking the messages for the corresponding one of the number of user sessions or host sessions. The counter may be incremented by an incrementing means when application 264 creates an output message to be sent to the corresponding one of the number of users, such as any one of workstation 222, workstation 224, workstation 226 and workstation 228. The incrementing means may be implemented via hardware within extended processing complex 240. The incrementing means may alternatively be implemented via hardware within host A 232, or via software within application 264. The incrementing means provides an indication to the counter that an output message has been created so that the counter may increment. The counters within XPC lock table 320 may be decremented by a decrementing means when the output message is released by application 264 to the corresponding one of the number of users. The decrementing means may be implemented via hardware within extended processing complex 240. The incrementing means may alternatively be implemented via hardware within host A 232, or via software within application 264. The decrementing means provides an indication to the counter that the output message has been released by application 264 so that the counter may decrement. The counter being decremented indicates that there are no dependencies for the corresponding one of the number of user sessions with regard to the output message. In the preferred embodiment, any counter being decremented to a predetermined value indicates that there are no dependencies with regard to any of the number of messages. In the preferred embodiment, the predetermined value is zero.

A user session 1 shown at 330 corresponds to terminal ID #111 shown at 332, where the recoverable update flag at 334 being clear and the counter entry at 336 being zero indicates that are no dependencies for user session 1 shown at 330, with regard to the output message. User session 2 shown at 338 corresponds to terminal ID #222 shown at 340, where the recoverable update flag is shown as set at 342 and the counter is shown having a count of 1 at 344.

The entries under recoverable update flag 326 comprise an indication means. The indication means may be a number of indicators which each correspond to one of the number of user sessions shown in column 322. Any one of the number of entries or indicators under recoverable update flag 326 being set indicates that application 264 has received an input message from the corresponding one of the number of workstations and that the input message has not been processed by application 264. The recoverable update flag under 326 is cleared once the input message has been processed by application 264 for the corresponding user session under 322.

Any one of the number of counter entries in column 328 are incremented when the recoverable update flag within column 326 is set for the corresponding user session in column 322. The counter entry in column 328 is decremented once the corresponding one of the number of indicators or recoverable update flag entries under 326 are cleared. In the preferred embodiment, any counter being decremented to a predetermined value indicates that there are no dependencies for the corresponding one of the number of user sessions with regard to any of the number of messages. In the preferred embodiment, the predetermined value is zero. Thus the counter entry under 328 being equal to zero indicates that there are no dependencies for the corresponding one of the number of user sessions under 322. If the input message is a committing transaction, the corresponding one of the number of hosts must update the memory once the committing transaction is received. In the exemplary embodiment, this could be any transaction that comprises a write operation, wherein application 264 performs a write operation to update the contents of the memory or common database. In XPC lock table 320, with the committing transaction, the corresponding one of the number of indicators or entries in column 326 is cleared once the committing transaction or write operation has been completed. The current state of user session 2 at 338 indicates that an input message has been received but not processed by application 264 (see also, FIG. 7). Once the input message has been processed, the recoverable update flag at 342 is cleared and the counter entry at 344 is decremented.

User session 3 shown at 346 corresponds to terminal ID #444 shown at 348, where the recoverable update flag at 350 is set, and the counter entry at 352 is set to a 2 (see also, FIG. 7). In this exemplary entry for user session 3 at 346, the counter being set at 2 as indicated at 352 and the recoverable update flag being set as shown at 350 indicates that an output message has been created which has not been released to the user or workstation having terminal ID #444 as indicated at 348, and that an input message has been received but not processed by application 264. It is understood that the counter entries within column 328 may be any number of counter entries.

Although the entries for user session 1 at 330, user session 2 at 338 and user session 3 at 346 as discussed above occur for different user sessions, it is understood that these may represent the state of one of the user sessions, for example user session 1 at 330, at any given time during the transaction processing. For example, user session 1 at 330 currently shows having no dependencies, as discussed above. In an exemplary embodiment, an output message may be created in response to an input message. Thus, if an input message or committing transaction has been received by host A 232 from workstation 222, a flag associated with user session 1 is set. At this point, user session 1 would have the same state as shown for user session 2 at 338. That is, the recoverable update flag at 334 would be set and the counter entry at 336 having a count of 1. Next, when application 264 creates an output message to be sent to the workstation 222 in response to the input message, the counter associated with the user session 1 is incremented once again to a count of 2. At this point, user session 1 would have the same state as shown for user session 3 at 346. That is, the recoverable update flag at 334 would be set and the counter entry at 336 would have a count of 2. Next, when the input message has been processed by the concurrent application, the recoverable update flag at 334 would be cleared and the counter would be decremented to a count of 1 once the flag is cleared. Finally, once the output message has been sent to workstation 222, the counter would be decremented to a count of 0. Thus user session 1 would have the same state as currently shown in FIG. 9. That is, the recoverable update flag at 334 would be clear and the counter entry at 336 would have a count of 0. The counter being decremented to a count of 0 indicates there are no dependencies for user session 1 at 330 with regard to any input or output messages.

User session N shown at 354 corresponds to terminal ID #NNN shown at 356 and indicates that any number of workstations similar to workstations 222, 224, 226, and 228 through 230 may be engaged in a current user session with any of host A 232 through host N 236 (see also, FIG. 6).

When a user session has completed processing, the particular session may terminate. The workstation may initiate a new user session which may correspond to the workstation communicating with another one of the number of hosts. Thus, for example, user session 1 shown at 330 for terminal ID #111 at 332 may terminate and another user session with host N 236 may begin. Although the exemplary inputs of XPC lock table correspond to user sessions with host A 232, it is understood that XPC lock table 320 may accommodate entries for any number of hosts represented in any number of formats. For example, XPC lock table 320 as shown in FIG. 9 may be duplicated within extended process complex 240 such that each XPC lock table corresponds to one of the number of hosts from host A 232 through host N 236.

Any user or workstation may initiate a new user session with a new host for any number of reasons. For example, in FIG. 6 if host A 232 should experience a failure, the workstations having current user sessions with host A 232 may be auto-switched to continue the user session with host N 236. It is understood that as application 264 is a concurrent application within an application group, the corresponding concurrent application within host N 236 may continue the processing for the particular workstation within a new user session.

Once a new user session has been initiated for a particular one of the number of workstations, the XPC lock table entry corresponding to the previous user session will be interrogated. Thus, in the exemplary embodiment shown in FIG. 7, if workstation 222 is switched from host A 232 to host N 236 if, for example, host A 232 were to experience a failure, user session 1 shown at 330 will be interrogated to determine if there were any dependencies for user session 1 with regard to any messages communicated between host A and workstation 222 during user session 1. In FIG. 9, the entry at 330 for user session 1 shows the recoverable update flag at 334 as being cleared, and the counter at 336 as being equal to zero, thus indicating that there are no dependencies. Host N 236 may then reestablish and continue the new user session with workstation 222.

If workstation 224 were switched to host N 236, once host N 236 interrogated XPC lock table 320 for user session 2 at 338, the recoverable update flag shown at 342 being set and the counter shown at 344 having a value of 1 would indicate that there is an outstanding dependency with host A 232. Thus, host N 236 would reestablish user session 2 to resolve the dependencies. With user session 2, the recoverable update flag being set indicates that an input message has been received which has not yet been processed by application 264. Once user session 2 at 338 is reestablished, the input message would be processed by application 264 before the new user session was continued. If the input message was a commit transaction, the common database would be updated before the new user session was continued.

If workstation 228 initiated a new user session with host N 236, host N 236 would interrogate XPC lock table 320 at user session 3 shown at 346. The recoverable update flag being cleared as indicated at 330, and the counter having a count of three as indicated at 352, indicate that output messages have been created by application 264 which have not yet been released to workstation 228. The three output messages indicated at 352 would be released to workstation 228 before the new user session was continued.

XPC lock table 320 does not have an entry for workstation which has terminal ID #333, as shown in the exemplary embodiment in FIG. 9. This is because in the exemplary embodiment, workstation 226 is not engaged in a current user session with host A 232.

Figure 10:
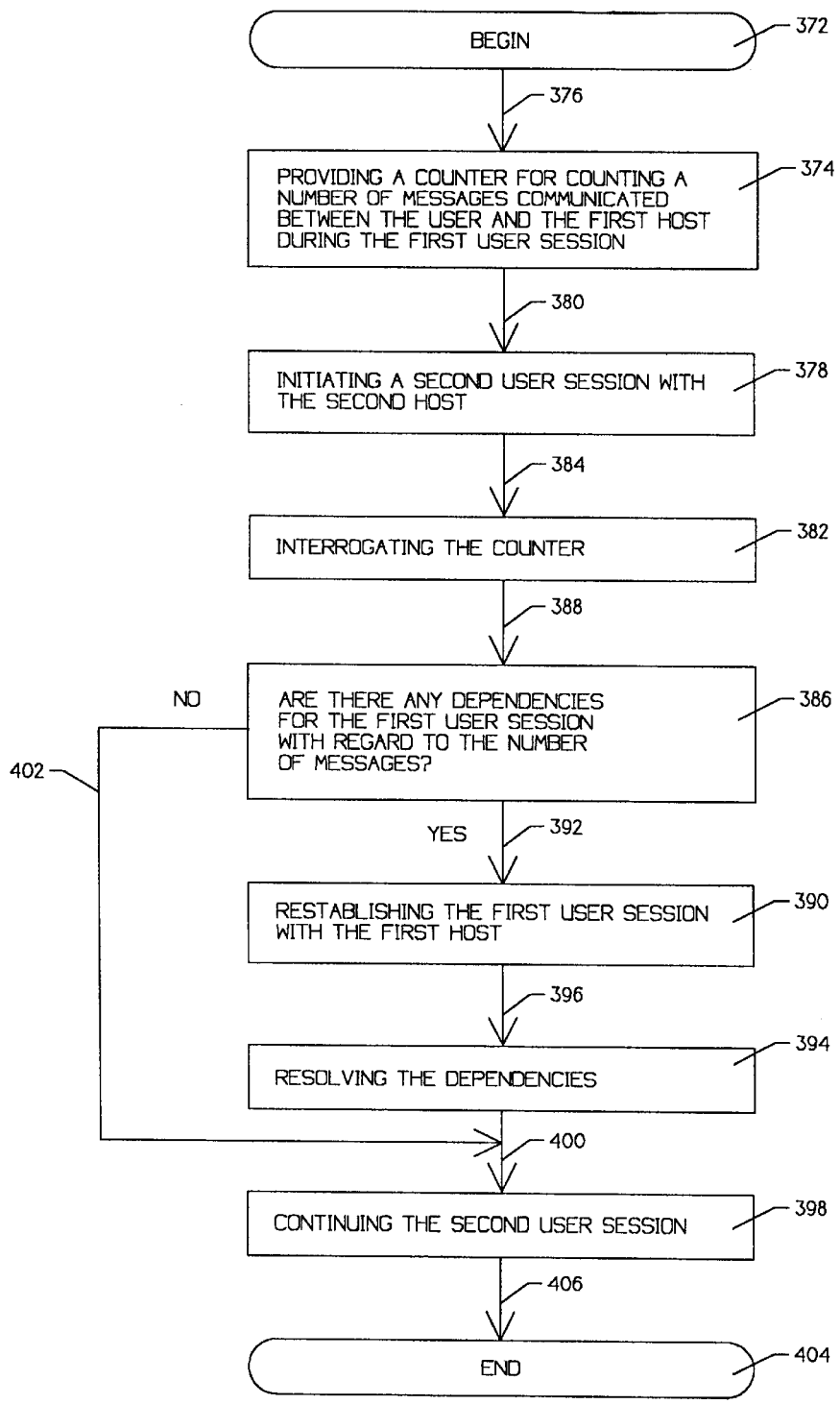
FIG. 10 is a flow diagram showing an exemplary method of the present invention.

FIG. 10 is a flow diagram showing an exemplary method of the present invention. The flow diagram determines if there are dependencies in a data processing system having a user coupled to a first host and a second host, where the first host and the second host are coupled to a common memory and execute a concurrent application. The user communicates with the first host in a first user session by sending a number of messages to and receiving a number of messages from the first host. The dependency exists when the concurrent application creates a one of the number of messages which has not been released to the user, or when the one of the number of messages has been received but not processed by the concurrent application. The flow diagram is shown generally at 370. The flow diagram is entered at element 372, wherein control is passed to element 374 via interface 376. Element 374 provides a counter for counting a number of messages communicated between the user and the first host during the first user session. Element 374 may further comprise the counter being incremented when the concurrent application creates the one of the number of messages which is to be sent to the user, where the counter is decremented once the one of the number of messages is released to the user. The counter being decremented indicates that there are no dependencies for the first user session with regard to the one of the number of messages. Element 374 may further comprise the counter having a value which is non-zero which indicates that there are dependencies, where the counter having the value of zero indicates there are no dependencies. Control is then passed to element 378 via interface 380. Element 378 initiates a second user session with the second host. Control is then passed to element 382 via interface 384. Element 382 interrogates the counter to determine if there are any dependencies for the first user session with regard to the number of messages. Element 382 may further comprise the second host determining if there are any dependencies for the first user session by reading the counter. Element 382 may further comprise providing an indicator, where the indicator is set when the concurrent application has received the one of the number of messages from the user and the one of the number of messages has not been processed by the concurrent application, where the indicator is cleared once the one of the number of messages has been processed by the concurrent application. Element 382 may further comprise the counter being decremented once the indicator has been cleared, where the counter being decremented indicates that there are no dependencies for the first user session with regard to the one of the number of messages. Control is then passed to element 386 via interface 388. If the condition of there being any dependencies for the first user session with regard to the number of messages is satisfied, control is passed to element 390 via interface 392. Element 390 reestablishes the first user session with the first host. Control is then passed to element 394 via interface 396. Element 394 resolves the dependencies. Element 394 may further comprise releasing any of the number of messages to the user which have not been released to the user. Element 394 may further comprise processing any of the number of messages which has been received but not processed by the concurrent application. Control is then passed to element 398 via interface 400. If the condition of there being any dependencies for the first user session with regard to the number of messages is not satisfied, control is passed to element 398 via interface 402. Element 398 continues the second user session. Control is then passed to element 404 via interface 406, where the algorithm is exited.

Figure 11:
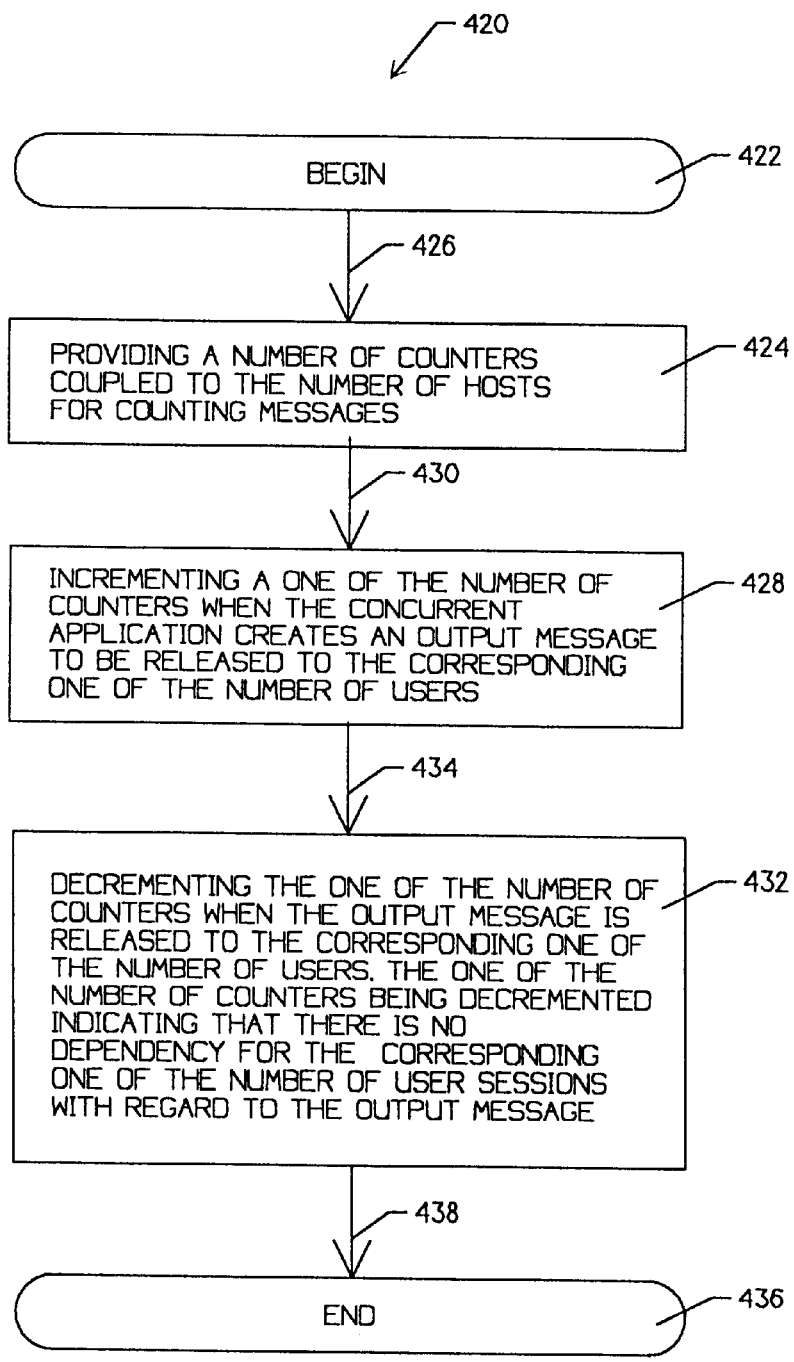
FIG. 11 is a flow diagram showing a second exemplary method of the present invention.

FIG. 11 is a flow diagram showing a second exemplary method of the present invention. The flow diagram determines if there are dependencies in a data processing system having a number of users coupled to a number of hosts, where the number of hosts are coupled to a common memory and execute a concurrent application, and where each one of a number of user sessions corresponds to a one of the number of users communicating with a one of the number of hosts executing the concurrent application. The diagram is shown generally at 420. The flow diagram is entered at element 422, wherein control is passed to element 424 via interface 426. Element 424 provides a number of counters coupled to the number of hosts for counting messages. Control is then passed to element 428 via interface 430. Element 428 increments the one of the number of counters when the concurrent application creates an output message to be sent to the corresponding one of the number of users. Control is then passed to element 432 via interface 434. Element 432 decrements the one of the number of counters when the output message is released to the corresponding one of the number of users, where the one of the number of counters being decremented indicates that there are no dependencies for the corresponding one of the number of user sessions with regard to the output message. Control is then passed to element 436 via interface 438, where the algorithm is exited.

Figure 12A:
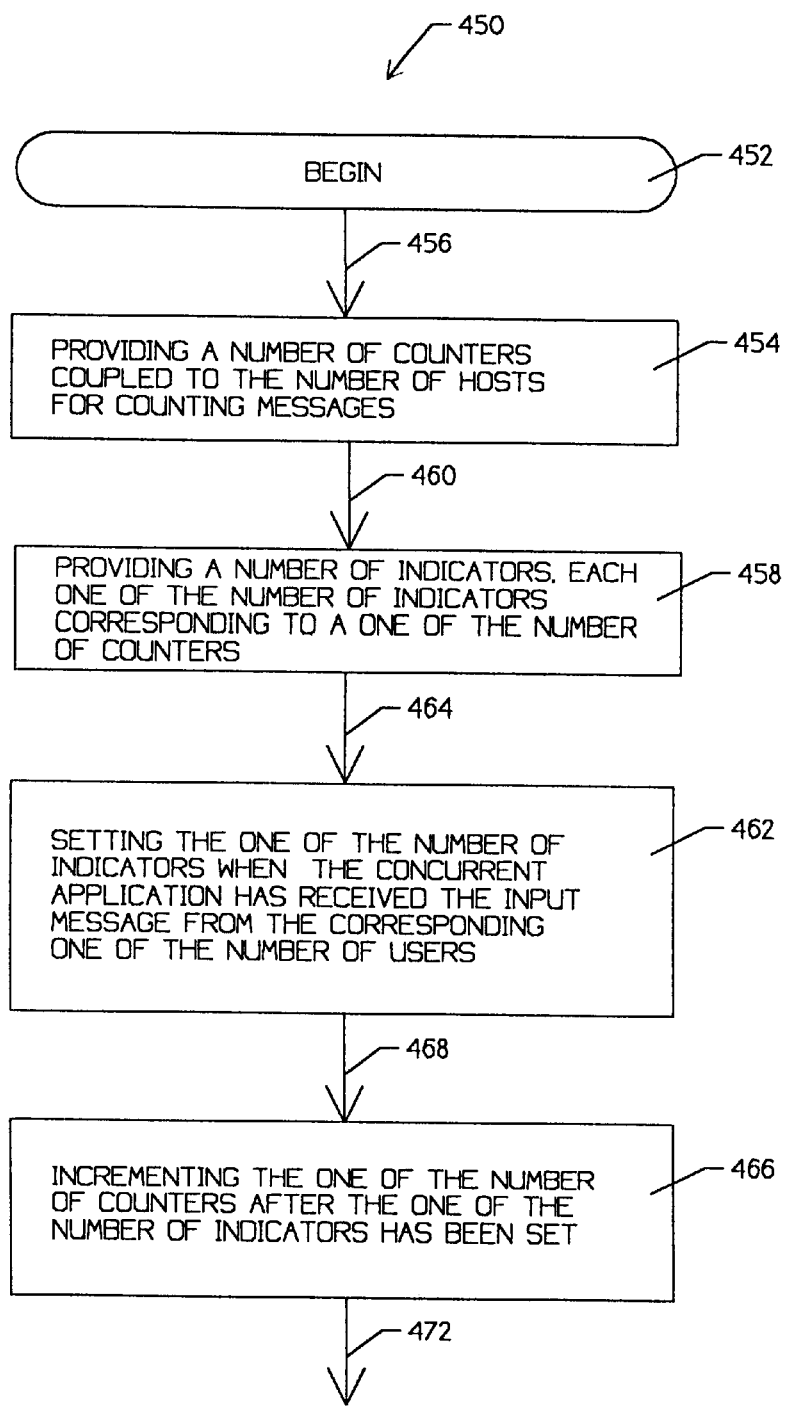
FIGS. 12A and 12B are a flow diagram showing a third exemplary method of the present invention.
Figure 12B:
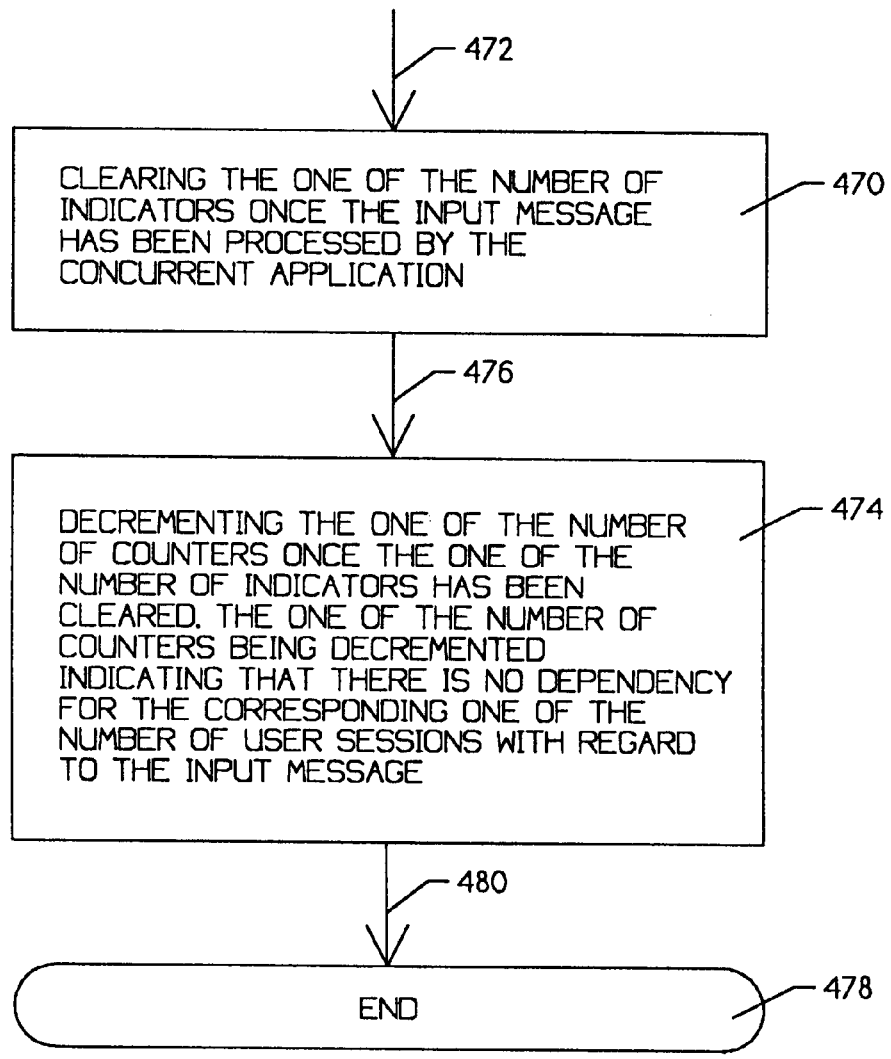

FIGS. 12A and 12B are a flow diagram showing a third exemplary method of the present invention. The flow diagram determines if there is a dependency in a data processing system having a number of users coupled to a number of hosts, where the number of hosts are coupled to a common memory and execute a concurrent application, and where each one of a number of user sessions corresponds to a one of the number of users communicating with a one of the number of hosts executing the concurrent application. The diagram is shown generally at 450. The flow diagram is entered at element 452, wherein control is passed to element 454 via interface 456. Element 454 provides a number of counters coupled to the number of hosts for counting messages. Control is then passed to element 458 via interface 460. Element 458 provides a number of indicators, each one of the number of indicators corresponding to a one of the number of counters. Control is then passed to element 462 via interface 464. Element 462 sets the one of the number of indicators when the concurrent application has received the input message from the corresponding one of the number of users. Control is then passed to element 466 via interface 468. Element 466 increments the one of the number of counters after the one of the number of indicators has been set. Control is then passed to element 470 via interface 472. Element 470 clears the one of the number of indicators once the input message has been processed by the concurrent application. Control is then passed to element 474 via interface 476. Element 474 decrements the one of the number of counters once the one of the number of indicators has been cleared, where the one of the number of counters being decremented indicates that there is no dependency for the corresponding one of the number of user sessions with regard to the input message. Control is then passed to element 478 via interface 480, where the algorithm is exited.

Figure 13A:
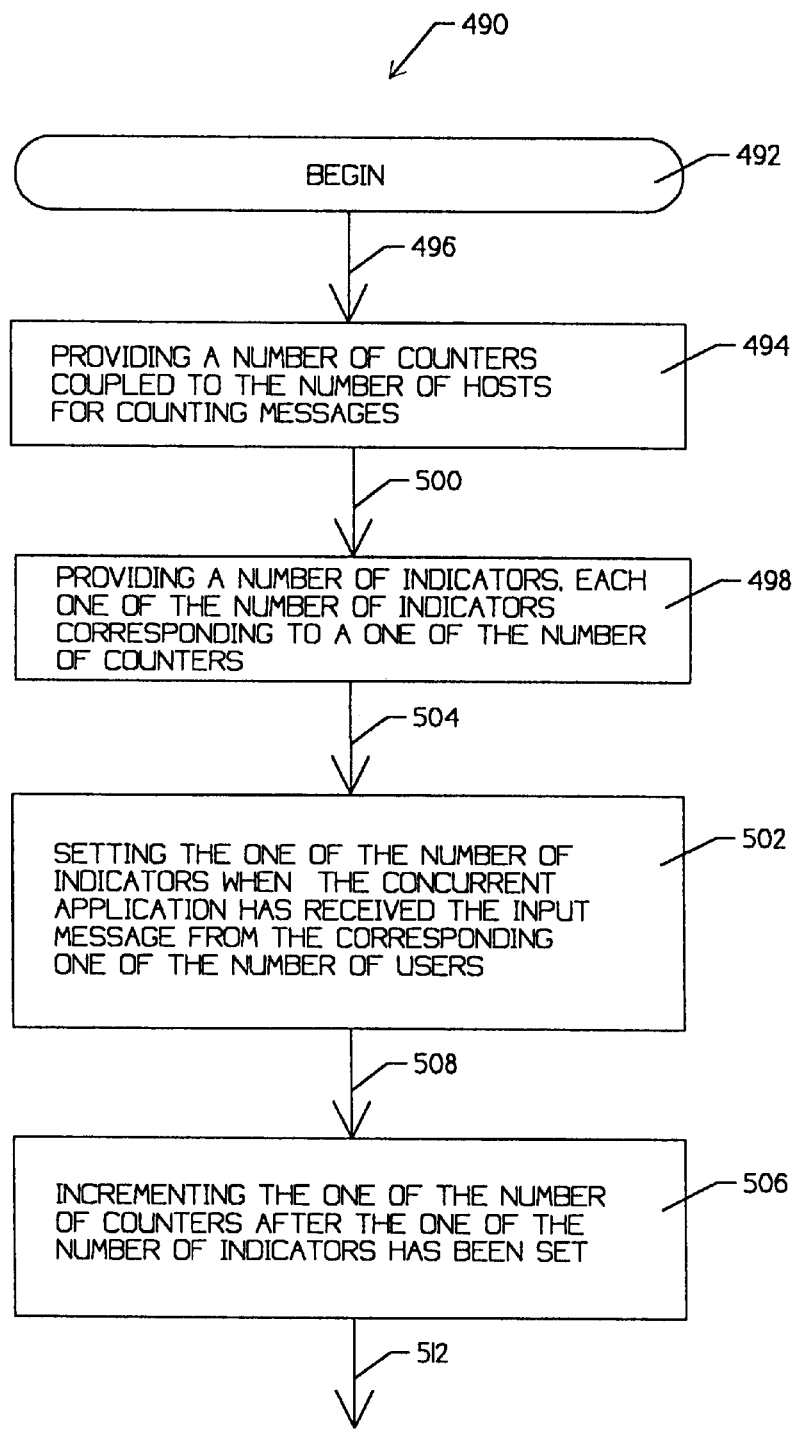
FIGS. 13A and 13B are a flow diagram showing a fourth exemplary method of the present invention.
Figure 13B:
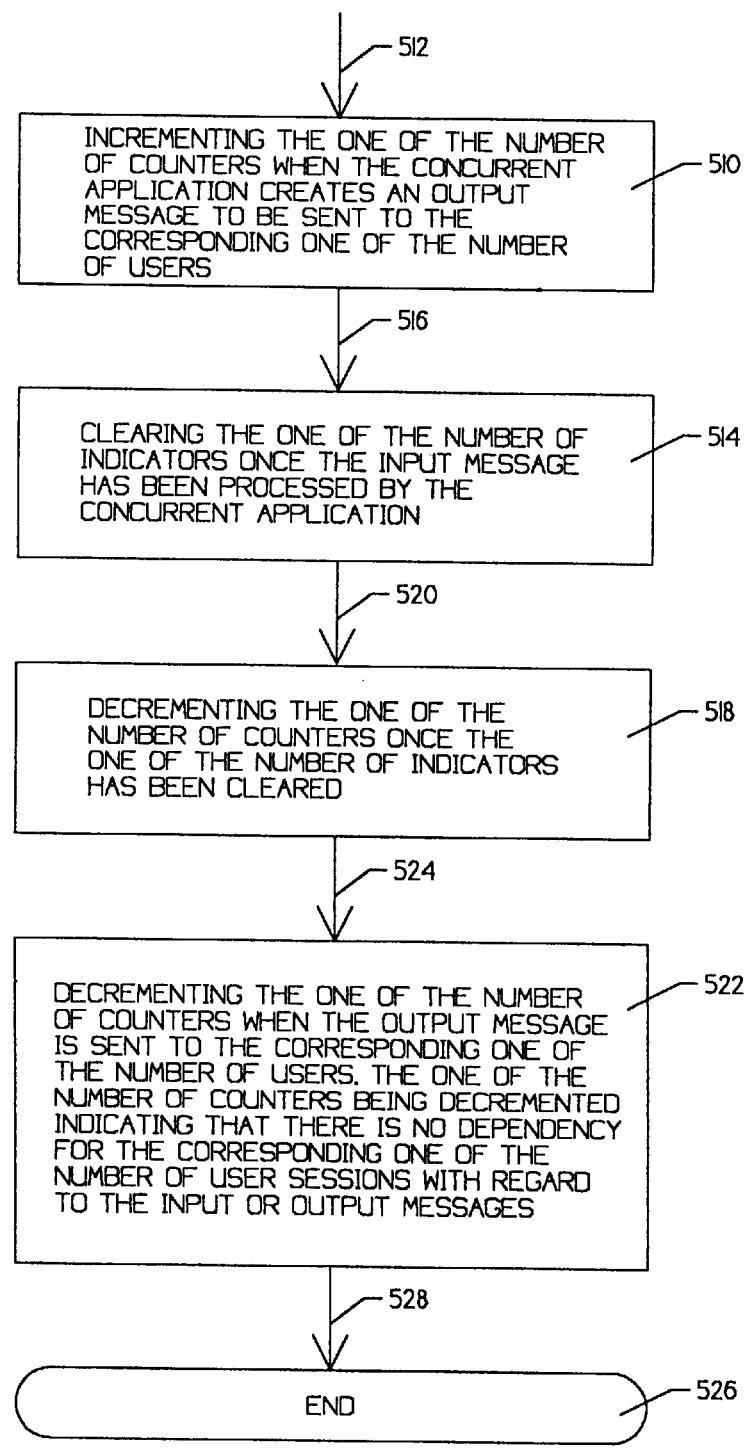

FIGS. 13A and 13B are a flow diagram showing a fourth exemplary method of the present invention. The flow diagram determines if there is a dependency in a data processing system having a number of users coupled to a number of hosts, where the number of hosts are coupled to a common memory and execute a concurrent application, and where each one of a number of user sessions corresponds to a one of the number of users communicating with a one of the number of hosts executing the concurrent application. The one of the number of users communicates with the one of the number of hosts by sending a number of messages to and receiving the number of messages from the one of the number of hosts. The dependency exists when the concurrent application has received an input message from the one of the number of users which has not been processed by the concurrent application, or when the concurrent application has created an output message which has not been sent to the one of the number of users.

The diagram is shown generally at 490. The flow diagram is entered at element 492, wherein control is passed to element 494 via interface 496. Element 494 provides a number of counters coupled to the number of hosts for counting messages. Control is then passed to element 498 via interface 500. Element 498 provides a number of indicators, each one of the number of indicators corresponding to a one of the number of counters. Control is then passed to element 502 via interface 504. Element 502 sets, the one of the number of indicators when the concurrent application has received the input message from the corresponding one of the number of users. Control is then passed to element 506 via interface 508. Element 506 increments the one of the number of counters after the one of the number of indicators has been set. Control is then passed to element 510 via interface 512. Element 510 increments the one of the number of counters when the concurrent application creates an output message to be sent to the corresponding one of the number of users. Control is then passed to element 514 via interface 516. Element 514 clears the one of the number of indicators once the input message has been processed by the concurrent application. Control is then passed to element 518 via interface 520. Element 518 decrements the one of the number of counters once the one of the number of indicators has been cleared. Control is then passed to element 522 via interface 524. Element 522 decrements the one of the number of counters when the output message is sent to the corresponding one of the number of users, where the one of the number of counters being decremented indicates that there is no dependency for the corresponding one of the number of user sessions with regard to the input or output messages. Control is then passed to element 526 via interface 528, where the algorithm is exited.

Having thus described the preferred embodiments of the present invention, those of skill in the art will readily appreciate that the teachings found herein may be applied to yet other embodiments within the scope of the claims hereto attached.

What is claimed is:

1. In a data processing system having a number of users coupled to a number of hosts, the number of hosts coupled to a common memory and executing a concurrent application, each one of a number of user sessions corresponding to a one of the number of users communicating with a one of the number of hosts executing the concurrent application, the one of the number of users communicating with the one of the number of hosts by sending a number of messages to and receiving the number of messages from the one of the number of hosts, the improvement comprising:

a. counting means coupled to the number of hosts for counting the number of messages, said counting means counting the number of messages for the corresponding one of the number of user sessions;

b. incrementing means coupled to said counting means for incrementing said counting means when the concurrent application creates a one of the number of messages to be sent to the corresponding one of the number of users; and c. decrementing means coupled to said counting means for decrementing said counting means when the one of the number of messages is released to the corresponding one of the number of users.

2. A data processing system having a number of users coupled to a number of hosts, the number of hosts coupled to a common memory and executing a concurrent application, each one of a number of user sessions corresponding to a one of the number of users communicating with a one of the number of hosts executing the concurrent application, the one of the number of users communicating with the one of the number of hosts by sending a number of messages to and receiving the number of messages from the one of the number of hosts, comprising:

a. counting means coupled to the number of hosts for counting the number of messages, said counting means counting the number of messages for the corresponding one of the number of user sessions;

b. incrementing means coupled to said counting means for incrementing said counting means when the concurrent application creates a one of the number of messages to be sent to the corresponding one of the number of users; and c. decrementing means coupled to said counting means for decrementing said counting means when the one of the number of messages is released to the corresponding one of the number of users.

3. A data processing system according to claim 2 wherein the counting means being decremented indicates that there are no dependencies for the corresponding one of the number of user sessions with regard to the one of the number of messages, a dependency existing when the concurrent application creates the one of the number of messages which has not been released to the corresponding one of the number of users.

4. A data processing system according to claim 3 wherein the counting means having a predetermined value indicates that there are no dependencies for the corresponding one of the number of user sessions with regard to any of the number of messages.

5. A data processing system according to claim 4 wherein the predetermined value is zero.

6. A data processing system according to claim 4 wherein the counting means comprises a number of counters, said number of counters coupled to the number of hosts for counting the number of messages, each one of said number of counters corresponding to the one of the number of user sessions to count the number of messages for the corresponding one of the number of user sessions.

7. A data processing system according to claim 4 wherein the number of users are a number of workstations.

8. A data processing system according to claim 2 further comprising an indication means coupled to the number of hosts for indicating that the concurrent application has received the one of the number of messages from the corresponding one of the number of users and that the one of the number of messages has not been processed by the concurrent application.

9. A data processing system according to claim 8 wherein the indication means is set when the concurrent application has received the one of the number of messages from the corresponding one of the number of users and the one of the number of messages has not been processed by the concurrent application, the counting means being incremented when said indication means is set.

10. A data processing system according to claim 9 wherein the indication means is cleared once the one of the number of messages has been processed by the concurrent application, the counting means being decremented once the indication means has been cleared, the counting means being decremented indicating that there are no dependencies for the corresponding one of the number of user sessions with regard to the one of the number of messages, a dependency existing when the concurrent application has received the one of the number of messages from the corresponding one of the number of users but the one of the number of messages has not been processed by the concurrent application.

11. A data processing system according to claim 10 wherein the counting means having a predetermined value indicates that there are no dependencies for the corresponding one of the number of user sessions with regard to any of the number of messages.

12. A data processing system according to claim 11 wherein the predetermined value is zero.

13. A data processing system according to claim 11 wherein the counting means comprises a number of counters, said number of counters coupled to the number of hosts for counting the number of messages, each one of said number of counters corresponding to the one of the number of user sessions to count the number of messages for the corresponding one of the number of user sessions.

14. A data processing system according to claim 11 wherein the one of the number of messages is a committing transaction, the one of the number of hosts updating the memory once said committing transaction is received.

15. A data processing system according to claim 14 wherein the committing transaction comprises a write operation, the concurrent application completing said write operation to update the contents of the memory, the indication means being cleared once the write operation has been completed.

16. A data processing system according to claim 15 wherein the number of users are a number of workstations.

17. A data processing system having a number of users coupled to a number of hosts, the number of hosts coupled to a common memory and executing a concurrent application, each one of a number of user sessions corresponding to a one of the number of users communicating with a one of the number of hosts executing the concurrent application, the one of the number of users communicating with the one of the number of hosts by sending a number of messages to and receiving the number of messages from the one of the number of hosts, comprising:

a. a number of counters coupled to the number of hosts for counting the number of messages, each one of said number of counters corresponding to the one of the number of user sessions to count the number of messages for the corresponding one of the number of user sessions.

18. A data processing system according to claim 17 wherein the one of the number of counters counting the number of messages for the corresponding one of the number of user sessions is incremented when the concurrent application creates an output message to be sent to the corresponding one of the number of users.

19. A data processing system according to claim 18 wherein the one of the number of counters is decremented when the output message is released to the corresponding one of the number of users.

20. A data processing system according to claim 19 wherein the one of the number of counters being decremented indicates that there are no dependencies for the corresponding one of the number of user sessions with regard to the output message, a dependency existing when the concurrent application has created the output message which has not been released to the corresponding one of the number of users.

21. A data processing system according to claim 20 wherein the one of the number of counters being equal to zero indicates that there are no dependencies for the corresponding one of the number of user sessions.

22. A data processing system according to claim 21 wherein the number of users are a number of workstations.

23. A data processing system according to claim 17 wherein each one of the number of counters further comprises an indicator, each one of a number of indicators corresponding to one of the number of user sessions, each one of said number of indicators indicating that the concurrent application has received the input message from the corresponding one of the number of users and that the input message has not been processed by the concurrent application.

24. A data processing system according to claim 23 wherein the one of the number of indicators is set when the concurrent application has received the input message from the corresponding one of the number of users and the input message has not been processed by the concurrent application, the one of the number of indicators being cleared once the input message has been processed by the concurrent application.

25. A data processing system according to claim 24 wherein the one of the number of counters counting the number of messages for the corresponding one of the number of user sessions is incremented when the one of the number of indicators is set.

26. A data processing system according to claim 25 wherein the one of the number of counters is decremented once the corresponding one of the number of indicators has been cleared.

27. A data processing system according to claim 26 wherein the one of the number of counters being decremented indicates that there are no dependencies for the corresponding one of the number of user sessions with regard to the input message, a dependency existing when the concurrent application has received the input message from the corresponding one of the number of users but the input message has not been processed by the concurrent application.

28. A data processing system according to claim 27 wherein the one of the number of counters being equal to zero indicates that there are no dependencies for the corresponding one of the number of user sessions.

29. A data processing system according to claim 28 wherein the input message is a committing transaction, the one of the number of hosts updating the memory once said committing transaction is received.

30. A data processing system according to claim 29 wherein the committing transaction comprises a write operation, the concurrent application completing said write operation to update the contents of the memory, the one of the number of indicators being cleared once the write operation has been completed.

31. A data processing system according to claim 30 wherein the number of users are a number of workstations. stations.

* * * * *